Oct. 6, 1953

K. E. PEILER

2,654,184

GLASS FEEDING APPARATUS

Filed April 21, 1949

INVENTOR
KARL E. PEILER

Parham + Bates
ATTORNEYS

Oct. 6, 1953 K. E. PEILER 2,654,184
GLASS FEEDING APPARATUS
Filed April 21, 1949 5 Sheets-Sheet 3

INVENTOR
KARL E. PEILER
BY Parham & Bates
ATTORNEYS

Oct. 6, 1953 K. E. PEILER 2,654,184
GLASS FEEDING APPARATUS
Filed April 21, 1949 5 Sheets-Sheet 4

INVENTOR
KARL E. PEILER
BY Parham & Bates
ATTORNEYS

Oct. 6, 1953 K. E. PEILER 2,654,184
GLASS FEEDING APPARATUS
Filed April 21, 1949 5 Sheets-Sheet 5

INVENTOR
KARL E. PEILER
BY Parham & Bates
ATTORNEYS

Patented Oct. 6, 1953

2,654,184

UNITED STATES PATENT OFFICE 2,654,184

GLASS FEEDING APPARATUS

Karl E. Peiler, West Hartford, Conn., assignor to Emhart Manufacturing Company, a corporation of Delaware Application April 21, 1949, Serial No. 88,869

15 Claims. (Cl. 49—55)

This invention relates to glass feeding apparatus in which a forehearth is connected to and receives molten glass from a glass melting furnace and has at its outer end a delivery or feeding chamber from which mold charges of molten glass are supplied to forming machines. More specifically, it relates to such feeding apparatus in which the mold charges are accumulated and severed in suspension below a discharge orifice or a plurality of such orifices.

Modern demands for better quality in glass containers and also for lighter, thinner walled containers require better mold charges fed to the forming machine. These mold charges should have greater uniformity and accuracy of weight, shape, temperature and temperature distribution than those heretofore generally fed by existing glass feeding apparatus.

The glass supplied by the melting furnace to such feeding apparatus generally has to be cooled to bring it to the desired temperature for the mold charges, but sometimes it has to be raised in temperature. In cooling the glass as it passes through the forehearth, some of it is overcooled and some of it is undercooled. Similarly, in heating it, some of it is overheated and some of it is not heated enough. In each instance, the average temperature of the glass as it approaches the feed chamber is generally that desired, but there are temperature differences above and below this desired temperature. This effect is influenced by greater resistance to viscous flow along the sides and bottom of the forehearth and by the cooling influences of such sides and bottom. The glass on top and in the center flows faster than that at the sides and bottom, and, therefore, there is most generally a considerable difference in temperature between the glass at the top and center than that at the sides and bottom. These temperature differences cause differences in temperature in the mold charges which are fed.

The glass supplied by the melting furnace also frequently has inequalities in it. These may persist in the travel through the forehearth, particularly if they are inequalities of composition. Such inequalities as cannot be reduced by passage through the forehearth, also act to cause inequalities in the mold charges which are fed.

It is well known that mold charges formed and severed in suspension from this type of apparatus have an outer skin which while hot and plastic is still substantially colder than the interior of the mold charge. This skin is rendered colder and thicker by the colder, more viscous glass which travels more sluggishly along the bottom and sides of the forehearth, and particularly of the feed chamber. This colder glass forms a lining for the bottom of the feed chamber and flows to form the outside of the mold charges, exaggerating the cold skin condition. I have found that an increase in the temperature of this skin to more nearly the temperature of the interior of the mold charge, and a decrease in the thickness of the skin, to be highly desirable. It is also desirable to have the temperature and thickness of the skin symmetrical with respect to the vertical axis of the mold charge. This permits making not only better quality ware, but also thinner walled ware of controllable thickness distribution.

In feeding two or more mold charges at a time from a plurality of orifices in the bottom of the feed chamber with this type of apparatus, it is very desirable that both mold charges have the same temperature and viscosity of glass, and that they be alike in temperature distribution. Because of inequalities in temperature and viscosity in the glass flowing to such a plurality of orifices, such multiple mold charges are frequently not alike, but differ in shape, weight and temperature, as well as in the distribution of temperature throughout the charge. The problem is to make the same kind of glass come out of each orifice so that the weight, shape, temperature and viscosity will be the same.

Increased demands on modern glass feeding apparatus for higher feeding speeds, greater range of mold charge sizes and higher tonnage discharge rates have substantially increased the demand for a more rugged feeder mechanism with more convenient operating adjustments. Moreover, such feeders operate continuously for long periods with practically no time out for repairs, and it is desirable to have extremely rugged mechanisms with adjustments that can be made readily during operation. All adjustments should be convenient and easy to make, as well as of sufficient range to meet all possible operating conditions.

On account of higher production speeds and the necessity for economies, conveniences in the easy and quick replacement of expendable parts, such as refractory parts, is very important. In replacing a worn discharge orifice ring, for instance, difficulties are often encountered in forming a proper seal between the orifice ring and the bottom of the feed chamber to which it is affixed, due to the variable conditions caused by differences in hand manipulation. Similarly, the replacement of other worn refractory parts, or of such expendable parts as shear blades, may consume considerable time. The loss of this time is multiplied by its effect on temperature conditions in the forming machine.

It is the general object of this invention to feed mold charges of better quality with improved temperature distribution and with greater uniformity in weight, shape, temperature and viscosity than heretofore.

A further object is to blend and equalize the glass as it flows through the feed chamber to the discharge orifice or orifices to minimize inequalities in the glass such as differences in temperature and viscosity.

A more specific object is to prevent stagnation and accumulation in the feed chamber of glass colder and more viscous than the glass forming the interior of the mold charges.

A further object is to minimize the temperature difference between the interior of a mold charge and its colder outer layer or skin and to reduce the thickness of this colder skin.

A more specific object is to make this skin and its temperature distribution as symmetrical as possible with respect to the vertical axis of the mold charge.

Another object is to feed simultaneously a plurality of mold charges with their weight, shape, temperature and viscosity each as nearly alike as possible. That is, two or more charges may be fed simultaneously in each cycle of operation of the feeder, and these charges should be as nearly as possible of the same weight and shape and have the same temperature and viscosity distribution as nearly as possible.

Another object is to feed a series of groups of charges in regular recurring cycles, each group consisting of two or more charges fed simultaneously and to minimize the differences in weight, shape, temperature distribution and viscosity distribution between the successive charges.

A further object is to provide improved mechanism for glass feeding apparatus adapted to operate through a wider productive speed range and having improved operating adjustments and conveniences.

A more specific object is to provide improved means for holding and replacing expendable parts.

Other objects and advantages of the invention hereinafter will be pointed out or will be apparent from the following description of a practical embodiment of such invention as illustrated in the accompanying drawings, in which:

Fig. 1 is a longitudinal vertical section of a feeder bowl and of a fragmentary portion of a forehearth channel structure to which the bowl is attached and of glass homogenizing and feed controlling parts, the view also showing in elevation a fragmentary portion of the shear mechanism;

Fig. 1-A is a perspective view of a ring for supporting the bowl spaced above the bottom of its casing;

Fig. 7 is a horizontal section through the feeder bowl and glass homogenizing and feed control means, with all other parts omitted;

Figures 1, 1A, 7:
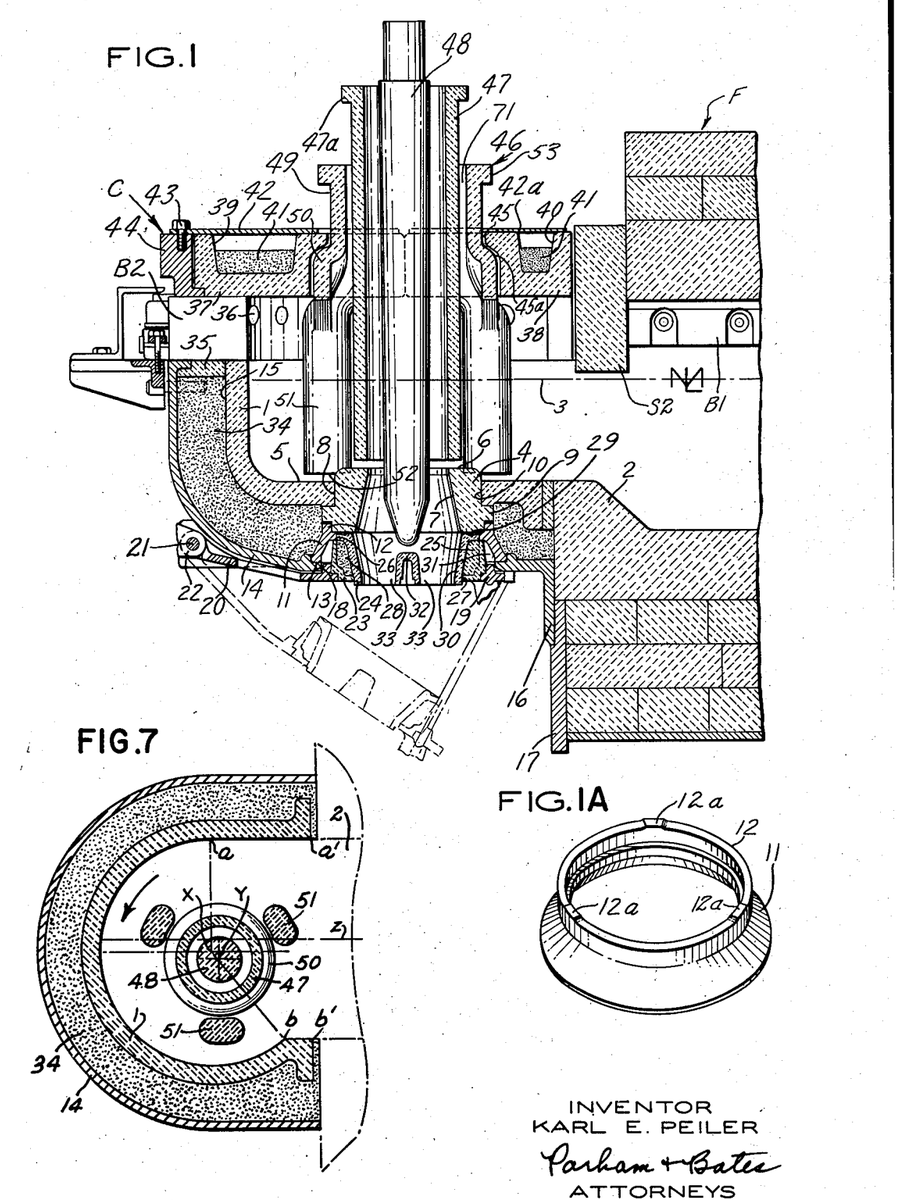

The feeder shown in the drawings comprises a refractory glass discharge or feed bowl 1, Fig. 1, which may be operatively joined to a refractory forehearth flow channel 2, Fig. 1, so that molten glass from a supply melting tank furnace, not shown, may flow through the channel and to the feed bowl to fill the latter to a predetermined level, as to the so-called "metal line," indicated at 3 in Fig. 1. The feeder bowl has a cover structure generally designated C. The forehearth front section and the bowl cover structure have heating provisions represented by the burner blocks B-1 and B-2, respectively.

The forehearth per se does not form part of the present invention. That indicated by the partial showing thereof in Fig. 1 is commonly known as Hartford-Empire Company's type K forehearth and an example thereof is shown and described in U. S. Patents No. 2,139,911 of December 13, 1938, and No. 2,144,973 of January 24, 1939. While others may be used, this type of forehearth is preferred by me as best suited to supply a stream of molten glass to the feed bowl of my novel feeder in a better condition so far as temperature, viscosity and homogeneity are concerned than other known types of forehearths. Stirrers (not shown) may be provided in the forehearth channel to aid in eliminating cords, striae and inequalities in the glass stream flowing to the feed bowl. As hereinafter will be explained, the feed controlling provisions of the novel feeder of the present invention have the separate but coordinated functions of controlling weight and shape of the charges fed but also circulate and blend all glass entering the bowl enroute to the feed outlet or outlets so as to assure desirable uniformity of temperature, viscosity and condition of the glass arriving at such outlet or outlets.

The feed bowl is made of glass-resistant refractory material and may be made in one piece. I prefer, however, to make it in two pieces, one forming the main body of the bowl and the other one consisting of an especially glass-resistant insert or bushing. This permits the body of the bowl to be made of a more suitable material to resist heat shock, and also permits the bushing which forms the discharge well, in which the lower end of the plunger acts, to be made of a more highly glass-resistant material which would not be so suitable for heat shock. The bushing projects a substantial distance below the feed bowl. The lower part of the bushing rests on a support and thus supports the feed bowl, the bushing being held between the support and the feed bowl. The bushing is cemented in place in the feed bowl to prevent leakage of glass.

The feed bowl has a tubular outlet member 4 in its bottom projecting upwardly into the glass in the feed bowl above the level of the adjacent surface 5 of the feed bowl bottom in the form of an annular curb 6 around the upper end of a vertical outlet passage 7 through the member 4, Fig. 1. This outlet member 4 is shown as being a separate refractory bushing or tube suitably shaped and of suitable size at 8 above an external flange 9 on the lower portion thereof to fit a vertical opening 10 in the bottom of the feed bowl and to protrude upwardly in the feed bowl to define the curb 6 when the member 4 has been raised until its flange 9 bears against the bottom of the feed bowl.

The present invention provides means to support the refractory bowl within and spaced above the bottom of a supporting casing, which may be made of cast iron in accordance with usual practice, so as to effect a substantial reduction of heat flow from the bowl to the casing, thereby aiding in minimizing stagnant, cold glass on the bowl floor and lining the bowl outlet passage and also tending to make the temperature of the glass passing through such outlet more uniform throughout its cross-section by opposing the formation of a relatively colder outside skin thereon. In the example shown, a separate supporting ring 11 made of a material more resistant to heat and less heat conductive than the metal of which the casing is made supports the bowl above and in spaced relation to the bottom of the casing and breaks heat flow from the bowl to the casing by reason of its relatively poor heat conductivity and the joints between its upper and lower ends and the supported and supporting parts, respectively. The ring 11, Fig. 1-A, may be of downwardly enlarging shape from an internally flanged upper end portion 12 to its lower end. As shown in Fig. 1, its lower end is seated in an annular seat 13 in a suitably apertured bottom portion of the bowl casing which is generally designated 14. The lower end portion of the bowl outlet member rests upon the upper end of the ring 11 so that while the bowl is suitably located and supported in relation to the bottom of the casing, heat flow therefrom to the casing is poor. The actual structural details of the contacting portions of the parts may vary. In the example shown, the upper end surface of the ring 11 is provided with three angularly spaced relatively raised small area bearing surfaces or pads 12a on which the external flange 9 on the lower portion of the bowl outlet member rests and the extreme lower end portion of the bowl outlet member is located within the upper end portion 12 of the ring with which it has a close enough fit for bowl locating purposes without being in good heat exchanging contact therewith. The ring might be formed with similar angularly spaced supporting surfaces or pads on its lower end further to break its heat exchanging contact with the casing although these ordinarily will not be required and if employed should not be high enough to allow leakage of insulation underneath the ring from the space between the bowl and the casing. The ring 11 may be made of refractory to minimize heat conduction but preferably is made of a known suitably heat resistant, poorly conductive metal alloy.

The casing 14 corresponds in shape to the feed bowl, being sufficiently larger than such bowl to be spaced therefrom as indicated at 15, Fig. 1, when the feed bowl is supported therein through the agency of the bowl outlet member 4 and the supporting ring 11. The casing 14 may be flanged at the rear thereof as indicated at 16, Fig. 1, such flanged portion being secured to the metal casing or shell 17 of the forehearth channel. It, of course, will be understood that the forehearth channel structure, including the metal casing thereof, will be operatively secured to the molten glass supply furnace, not shown, and supported at the desired level by conventional supporting means, not shown.

The bottom of the bowl casing 14 is provided with an opening 18 within the annular seat 13 to accommodate an annular holder 19 on an arm 20 which is pivoted at 21 to a fixed supporting frame member 22, the axis of the pivotal support of the arm 20 being horizontal so that the arm 20 may swing vertically from its raised active position as shown in full lines in Fig. 1 to a lower retracted position as indicated by the dot-and-dash lines in the same view. The holder 19 carries a dish shaped holder 23 for an orifice ring 24. The holder 23 has an inwardly extending web or centering lugs 25 fitting underneath the flanged upper end portion 26 of the orifice ring so as to support the latter centrally in the holder 23 when the extreme lower end portion of the orifice ring projects through and below a central opening 27 in the holder 23. The space between the orifice ring 23 and the holder may be filled with granular insulation as indicated at 28 and the top of the orifice ring may be joined by luting 29 to the bottom end surface of the feeder bowl outlet member 4 so that the interior of the orifice ring 30 forms a continuation of the passage 7 in the outlet member 4. At this time, the upper end portion of the orifice ring fits within the smaller upper end portion 12 of the downwardly enlarging bowl supporting ring 11 and an annular air space 31 surrounds the orifice ring holder and aids in keeping it cool. The combined outlet passages 7, 30 define the effective glass discharge or feed well of the feeder. This well is downwardly enlarging for the portion thereof defined by the bowl outlet member 4 and then may be downwardly tapering in the orifice ring from the upper end of such orifice ring to the level of a transverse partition 32 in the orifice ring, this partition cooperating with the external wall of the lower part of the orifice ring to define a pair of similar final discharge orifices 33.

The bowl outlet member 4 may be integral with the bowl proper, although an insert outlet member, as shown, is provided as this permits use of outlet members having different shapes and sizes of flow passages with the same main bowl part.

The space 15 between the feed bowl and its casing may be filled with granular insulation as indicated at 34, Fig. 1. In the structure shown, an annular closure ring of refractory, indicated at 35, overlies the insulation in the space 15 and closes the gap between the upper end of the bowl casing and the upper part of the refractory feed bowl. Overlying these parts is a suitable burner block B-2, shown as being provided with burner openings at suitable places, some of such openings being shown at 36, Figs. 1 and 8. Superimposed on the burner blocks B-2 is a feed bowl cover comprising refractory blocks 37 and 38, Figs. 1 and 8. These refractory blocks may have open topped cavities therein as indicated at 39 and 40, respectively, for the reception of granular insulation 41. Suitable metallic top plates 42 and 42a may overlie the refractory blocks and meet along a line extending transversely across the vertical center line of the feed outlet. See Fig. 3. These may be fastened in place by suitable fastening means, as by cap screws such as are shown at 43 fastening the plate 42 to a fixed suitably shaped metal support 44 which overlies the burner block B-2 and partially underlies the refractory block 37.

The cover C is formed to define an opening 45 therein, Fig. 1, this opening being aligned with the bowl outlet passages 7, 30. Through such opening depend the several components of the glass homogenizing and feed control means. These comprise a rotary outer refractory glass homogenizing and stirring implement 46, a non-rotary inner refractory charge weight control tube 47, and a central reciprocable vertical refractory charge shape control plunger 48, all disposed in mutually concentric relation with each other and with the feed outlet and individually supported and operated by means presently to be described.

As hereinafter will become clear, the novel arrangement of glass homogenizing and feed control elements of the feeder of the present invention provides a commercially practicable separation of the three important functions of charge weight control, charge shape control, and circulation of the glass in the bowl to effect thorough blending and equalization of temperature of all parts of the glass passing to the discharge orifice or orifices. This is accomplished without undesirable change of level of the glass locally at the front or some other place in the feed bowl and so as to prevent accumulation of relatively colder, more viscous glass or stagnant glass on the floor of the bowl around the discharge passage or in a zone at the front of the bowl. Consequently, the glass fed downwardly through the feed orifice or orifices tends to be more uniform in temperature throughout its cross-section and to have less thickness of cold glass or "skin" on its periphery next to a glass discharge passage or orifice wall. These results all aid better control of weight, shape and condition of glass charges obtained by feed of glass from the bowl through one or two adjacent discharge orifices. Better distribution of temperature throughout the glass in the bowl also makes for a saving in fuel required to heat such glass in order to obtain from each discharge orifice successive charges of suitable shape, size and thermal condition to be blown or otherwise formed into glassware in the molds of an associate glassware forming machine.

Figure 9:
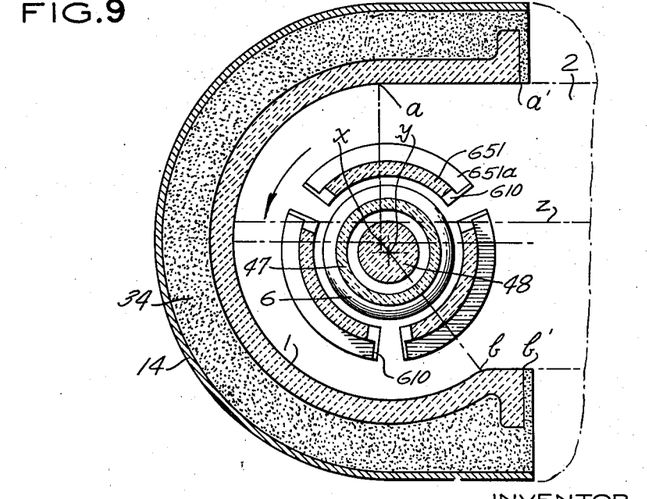
Fig. 9 is a horizontal section along the line 9—9 of Fig. 8.

It is to be noted from Figs. 7 and 9 that the feed bowl 1 is unsymmetrical in cross-sectional configuration and that the discharge outlet is located at one side of the longitudinal medial line of the glass stream entering the feed bowl from the forehearth channel. The side wall of the feed bowl coincides with an arc of a circle struck by a radius moving about the point located at $x$ from the point indicated at $a$ on the right hand side wall of the feed bowl to the point indicated at $b$ on its left hand side wall. The portion of the right hand side wall of the feed bowl from a point rearwardly to its juncture at $a'$ with the side wall of the forehearth channel 2 is substantially straight and parallel with the central line of the stream. It will be noted that the point $a$ is located forward of the vertical center line designated $y$ of the feed bowl outlet. The relatively short portion of the left hand side wall of the feed bowl from the point $b$ to its juncture at $b'$ with the left hand wall of the forehearth channel 2 likewise may be substantially straight and parallel with the longitudinal medial line of the glass stream entering the feed bowl, this line being indicated at $z$. The point $b$ is adjacent to the entrance to the feed bowl and rearward of the feed bowl outlet. Both the center of the arcuate main side wall portion of the feed bowl and the vertical center line of the feed bowl outlet are located to the left of the longitudinal medial line $z$ of the stream of glass entering the feed bowl. This arrangement causes glass to flow along a spiral path to the outlet passage and provides advantageous coaction between the rotary outer element of the glass homogenizing and feed control means, particularly when the direction of the rotation of the rotary element is counter-clockwise as indicated by the direction arrows in Figs. 7 and 9 so that glass is circulated in the feed bowl and is subjected to effective action from the cooperative components of the glass homogenizing and feed control means and the walls of the feed bowl to break up and reduce to a comparatively harmless character cords, streaks of contaminated glass, etc., arriving in the feed bowl. Thorough circulation and blending of different portions of the glass in the feed bowl are effected so that such glass is more nearly homogeneous and uniform in temperature and viscosity by the time it reaches the feed bowl outlet.

Figure 2:
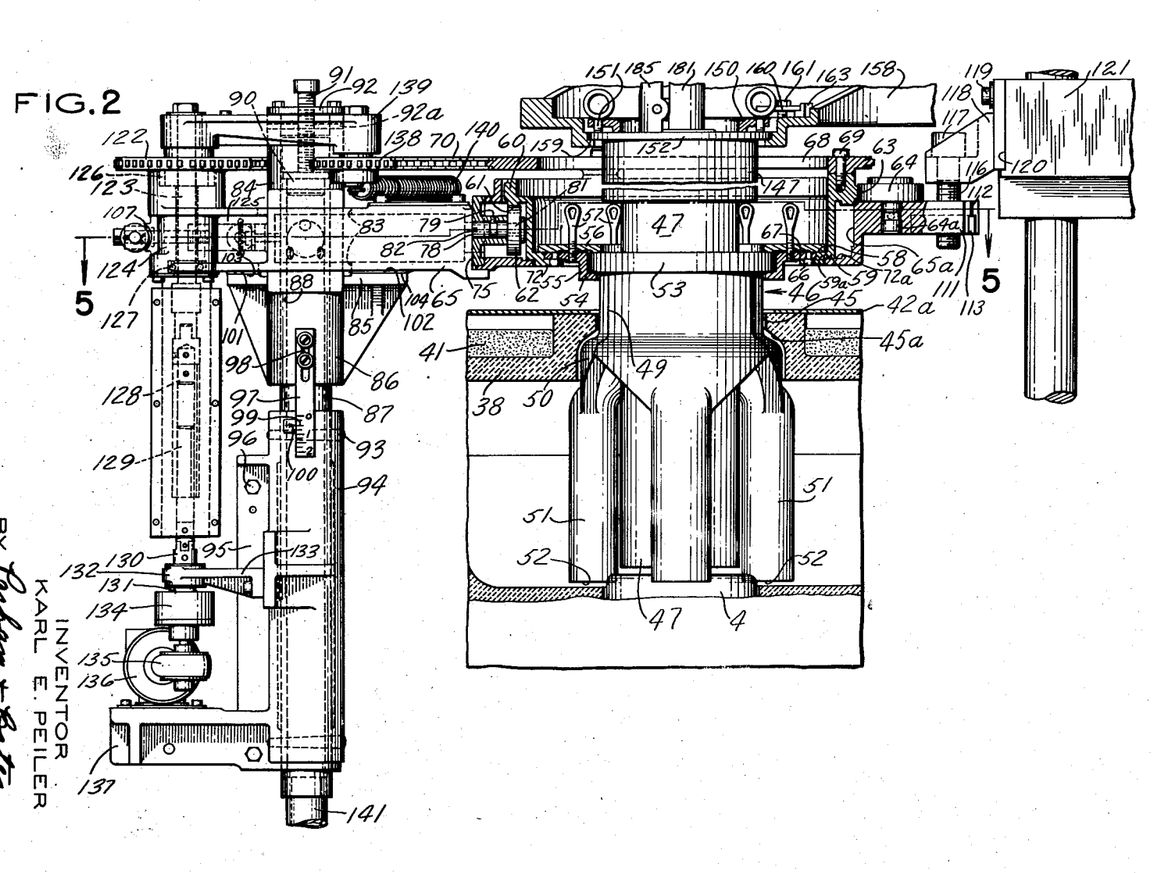
Fig. 2 is a partial view, showing in transverse vertical section a fragmentary portion of the feed bowl and part of the mounting for a glass stirring and homogenizing rotary implement which is included in the glass feed control means and in elevation the means for adjustably supporting such implement.
Figures 5, 6:
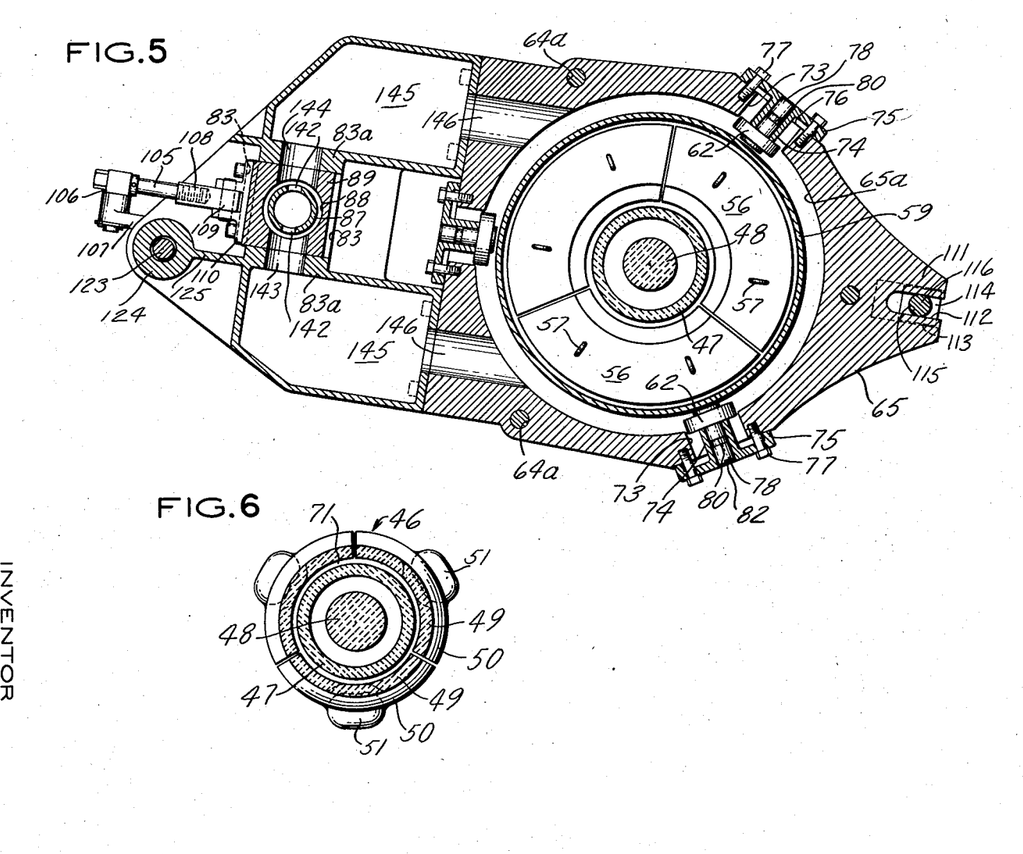
Fig. 5 is a section along the line 5—5 of Fig. 2.
Fig. 6 is a horizontal section through the assembly of glass homogenizing and feed controlling parts at a plane above the feeder bowl, which is omitted.

The rotary member 46, Figs. 1, 2 and 6, comprises a plurality of cooperative segmental sections, three in the example shown. Each of these segmental sections consists of a cylindrical upper portion 49 of slightly less than 120°, an outwardly flaring intermediate portion 50 and a relatively narrower lower portion 51 which, in the example shown, has a length approximately as great as that of the upper portion 49 and intermediate portion 50 combined. The lower portion 51 is the part which depends into the glass in the feed bowl. The portion 51 of the rotor segment may be relatively thicker radially and narrower arcuately than the remainder of the segment and may be formed to be generally oblong in cross-sectional configuration as best seen in Figs. 6 and 7. It is substantially vertical when supported in its operative position as in Figs. 1 and 2, for example, and has a flat bottom surface as indicated at 52 in these views.

The upper portion 49 of each segment has an external flange 53 fitting in a suitably configured seat 54 in a rotor chuck segment 55. The chuck segment is substantially Z-shaped in radial cross-sectional configuration as shown in Fig. 2. A suitable arcuate hold-down plate segment 56 is secured, as by eyebolts 57, Figs. 2 and 5, in place on the top of the chuck segment 55 so as releasably to clamp the rotor segment in its chuck segment. Each chuck segment 55 fits in an appropriate portion of an annular seat 58 in the lower part of an annular rotary chuck carrier 59, in which it may be releasably retained by the weight of the supported parts.

Figures 3, 4:
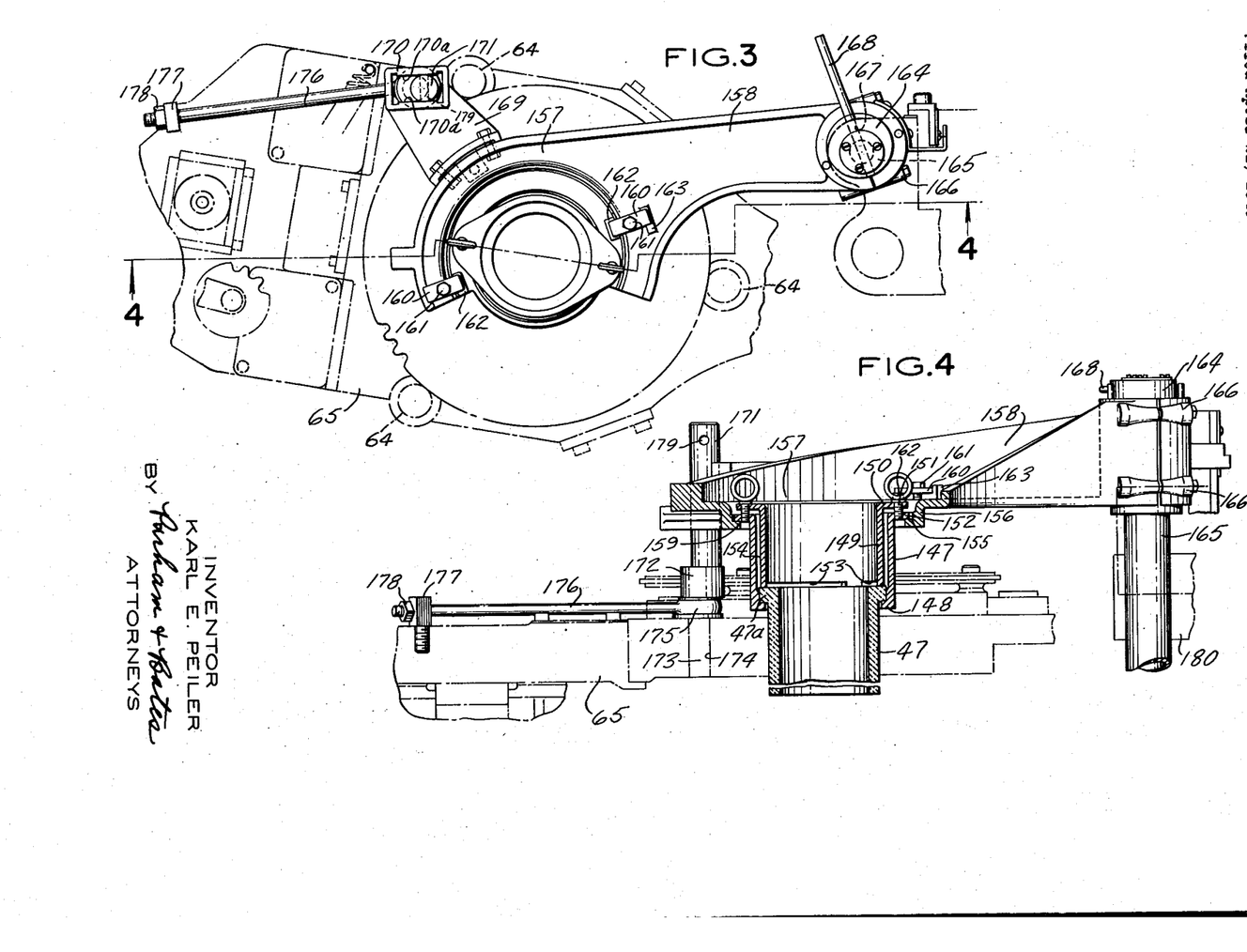
Fig. 3 is a fragmentary plan view of the means for adjustably and removably supporting a stationary tubular member which is included in the glass feed control means of the feeder.
Fig. 4 is a section along the line 4—4 of Fig. 3.

The rotary carrier 59 has an outwardly enlarged supporting upper portion 60, formed to provide a downwardly facing horizontal surface 61 bearing upon axially horizontally disposed rollers 62 which occupy relatively fixed positions. The upper portion 60 of the chuck carrier also has an outer peripheral surface 63 bearing against axially vertically disposed rollers 64 which likewise occupy relatively fixed positions. The rollers 62 and 64 are mounted as presently to be described on a horizontal supporting arm or frame 65. The rollers 62 turn about horizontal axes radial to the rotary chuck carrier 59 while the rollers 64 turn about vertical axes parallel to the axis of such chuck carrier. Three of the rollers 62 are shown in Fig. 5 as being spaced uniformly about the axis of the chuck carrier. The rollers 64 may be similar in number and spacing, as indicated in Fig. 3. Each of these rollers 62 or 64 may be a commercial unit which includes a self-contained anti-friction bearing assembly so that such roller turns easily about its own axis.

In assembling the segments of the refractory rotor 46, each may be placed in its individual chuck segment and then pre-heated at its lower end and for a desired part of its length. Thereafter, such chuck segment, with the pre-heated refractory rotor segment held thereby, may be lowered to a seated position in the annular chuck carrier 59. This position may be predetermined by a locating pin 66, Fig. 2, which is carried by the chuck segment in position to engage with a suitable recess 67 in the underlying portion of the rotary chuck carrier. Rotation of the chuck carrier to rotate the generally bell-shaped rotor with its depending legs or prongs in the glass in the feed bowl concentric with the feed outlet may be effected through the agency of an annular sprocket 68 secured by cap screws 69 in place on the top of the chuck carrier in concentric relation therewith and driven by a chain 70.

The action of the rotor is advantageous in effecting desirable circulation and blending of glass in the bowl on its way to the outlet. When the rotor is in an operative position, its lower glass engaging legs or prongs 51 extend vertically from a level well above that of the glass surface to a level below that of the curb 6 surrounding the upper end of the glass outlet flow passage 7, the flat, lower surfaces of such legs or prongs being spaced but slightly above the bottom surface of the feed bowl proper around the curb and their inner surfaces being closely adjacent to the outer peripheral surface of the curb. In actual practice, the spacing of the bottom surface of the rotor legs from the bottom of the feed bowl or spout may be from ¼ to ½ inch and the space between the curb and the inner side surfaces of the rotor legs may be as little as ¼ of an inch. With this arrangement, the stirring action of the rotor is effective clear to the bottom of the bowl around the curb and prevents accumulation there of colder and more viscous or stagnant glass which otherwise would cling to the bowl floor, such glass being plowed off the floor and impelled upwardly into and mixed with hotter glass. Also, since the glass engaging legs or prongs extend well above the glass surface, heat from the glass in the spout may radiate to the tube 47 within the rotor and the space between the rotor and the tube 47, indicated at 71 in Fig. 1, utilized as a stack for heated gases which on their way out will effectively heat the tube 47.

The stirring legs of the rotor also cooperate with the side wall of the feed bowl and with the tube 47 to circulate the glass in the bowl in a generally spiral path so as thoroughly to blend and equalize the temperature of the glass passing through the annular space between the bottom end of the tube 47 and the curb 6 to the feed bowl outlet as circulating glass passes into the space between the rotor legs and the tube 47, the latter being concentric with and spaced from the rotor, such glass is smeared against the tube and cords and inequalities therein broken up, attenuated and dispersed while en route to the bowl outlet flow passage.

The tube 47 also is the charge weight regulating element, the position of its lower end with relation to the top surface of the curb 6 determining the rate of flow of glass into the upper end of the outlet passage 7 and hence the rate of issuance of glass from the feed orifice or orifices. This tube 47 may be spaced an appropriate distance from the circular path of the glass engaging legs of the rotor, as, for example, about 1⅛ inch. The tube 47 is supported in its predetermined position by means presently to be described and it, of course, may be raised or lowered to vary the effective size of the annular flow passage between its lower end and the curb and may be lowered completely to the curb to shut off flow of glass completely when required or desired for any purpose, as for change or replacement of orifice rings.

The plunger 48 is supported in a central position within the tube so that its lower end depends into the well or outlet passage 7 and this plunger is reciprocated vertically to impart desired accelerative and retractive impulses to the glass in the outlet passage to aid the formation of and for control of the shape of the issuing charges. The means to adjustably support and reciprocate the plunger 48 presently will be described.

The circulation of glass in the feed bowl and the coaction of the feed control and glass homogenizing means comprising the elements just described with the spiral or unsymmetrical side wall of the bowl assures continuous delivery to the bowl well or outlet passage of glass at the proper rate and in proper condition as to temperature and viscosity for feeding of charges of predetermined weight and shape, both of which may be varied within wide ranges, and of suitable temperature and viscosity condition for the molds of the associate forming machine. The means described for supporting the bowl within and spaced from its casing breaks and minimizes heat loss from the bowl to the casing and permits a substantial increase in insulation under the bottom of the bowl. This increase of insulation and breaking of heat flow to the bowl casing contributes to the higher temperature of the outside skin of the charges. It also aids in minimizing stagnant, cold glass on the bowl floor and lining the bowl well.

Heat loss from the bowl orifice or orifices is minimized by increased insulation and by improved locating and supporting means for the orifice ring which break the heat flow to the orifice ring support. This reduced heat loss contributes to reduction of the colder outer skin on the charge.

The fire space over the glass in the bowl is baffled off from the space over the glass in the forehearth flow channel, thereby permitting a separate temperature control in the bowl which is very useful in regulating charge temperatures.

It will be noted that the opening 45, Fig. 1, in the cover C of the feed bowl is but slightly larger than the upper, relatively smaller portion of the rotor unit and is downwardly flaring or enlarged, as indicated at 45a, to fit rather closely around the outwardly enlarging or flaring portion 50 of the rotor unit. This permits but little heat loss from the feed bowl through the opening around the rotor unit. The opening is too small to permit raising of the rotor unit as such but the segments of such unit may be raised separately. This may be accomplished without disturbing the chuck carrier or displacing the plunger 48 or the tube 47 or their mountings. Thus, when it is desired to remove and replace a segment, the carrier of the assembled segments is rotatably adjusted until the segment to be removed is located at the front of the feeding container, i. e., next to the front cover section 37. This front cover section is moved forward a slight distance to enlarge the front portion of the opening in the cover so as to afford clearance for the segment which is raised and lifted through the opening of the annular chuck carrier, the segment being tilted and skewed around if necessary or helpful to its raising. This operation may be repeated for any further segment or segments to be removed. Replacement may be effected by reversing the operations just described. The eyebolts 57 provide a convenient means to which a hoist, not shown, may be attached for use in lowering the segments of the rotor unit to their operative positions in the feed bowl or in raising them therefrom.

*Rotor chuck carrier supporting and operating means*

The supporting arm or frame 65 has one end portion thereof formed to provide an open-topped, generally cylindrical chamber 65a, Figs. 2 and 5, in which the rotor chuck carrier 59 is disposed with its lower end portion 59a resting upon an annular seat 72a provided by an inwardly extending flange 72 on the frame 65 at the bottom of the chamber 65a when the chuck carrier is rotatably supported by its upper portion on the rollers 62 as hereinbefore pointed out. At appropriate places around its vertical axis, the wall of the cylindrical chamber 65a is apertured as indicated at 73, Fig. 5, to accommodate the rollers 62 and their mountings. Each such mounting comprises a hub 74 having an attaching plate 75 at its outer end secured against a flat outer face 76 on the support 65, as by cap screws 77, so that the hub 74 is disposed in the opening 73 with its axis radial of the chamber 65a. Journalled in the hub 74 is a rotatably adjustable roller shaft 78 which may be made fast to the hub in any angularly turned position, as by means of a screw 79 carried by the hub to project into an annular groove 80 in the shaft 78. The inner end portion of the shaft 78 is eccentric to the remainder thereof as indicated at 81, Fig. 2, and carries one of the rollers 62 which, as aforesaid, may be mounted thereon by means of a self-contained anti-friction bearing (not shown), as is conventional. The outer end of the shaft 78 is provided with a screw driver slot 82 whereby it may be turned individually about its axis to raise or lower its supported roller 62 and, of course, the portion of the chuck carrier supported thereon. By suitably adjusting the individual shafts 78 in this manner, the position of the entire rotor unit, as supported by the carrier, may be adjusted vertically within limits with relation to the floor of the feed bowl. The axially vertical rollers 64 have vertical supporting studs or shafts secured in place in vertical openings in the frame 65 as indicated at 64a in Fig. 2 for one of these rollers. The chuck carrier is positioned in axial alignment with the feed bowl outlet by the bearing contact of these axially vertical rollers 64 with the peripheral surface 63 of the chuck carrier.

Further and more extensive vertical adjustments and horizontal adjustments of the rotor unit to vary the height of the lower end thereof above the floor of the feed bowl and to center the rotor in relation to the outlet of the feed bowl are provided by the rotor supporting arm or frame 65 and the means for adjustably supporting it.

The supported portion of the arm or frame 65 is provided with a vertical opening 83, Fig. 2, to accommodate an upwardly projecting integral tubular column 84 on a saddle bracket 85 which underlies the supported portion of part 65. Bracket 85 also has an integral depending tubular portion 86 in line with and constituting a downward extension of the column 84. A fixed vertical tubular supporting shaft 87 extends from a lower level upwardly in a vertical bore 88 in the integral tubular members 86 and 84 and terminates in such bore at a level below the upper end of the column 84 and above the arm or frame 65. The portion of the column 84 which extends vertically through the arm or frame 65 may be externally rectangular as indicated at 89 in Fig. 5 and fits slidably between a pair of spaced integral guides 83a at opposite sides of the opening 83. A flanged plug 90 fits in the upper end of the tubular shaft 87 and provides a bearing surface for the lower end of an adjusting thrust screw 91 which is threaded through a flanged plug 92 which is pinned at 92a to the upper end portion of the tubular column 84. See Fig. 2. The tubular shaft 87 is fixed in position by being pinned, as at 93, to a vertical tubular member 94 which constitutes part of a bracket 95 that is fastened, as at 96, to a convenient part of the framework structure of the feeder. The arrangement thus provides for vertical adjustment of the rotor supporting arm or frame 65 and its saddle bracket 85 as a unit, such adjustment being effected by turning the adjusting thrust screw 91 against the plug 90 in the upper end of the fixed position vertical shaft 87. A scale strip 97 is adjustably secured by the vertical slot and fastening screw arrangement indicated at 98, Fig. 2, to the tubular portion 86 of the bracket 85 so as to depend below and adjacent to the tubular portion 94 of the fixed bracket 95. The scale strip 97 is provided with a vertical series of graduations 99 of a linear scale cooperative with an index element 100 on the fixed bracket part 94 so as to indicate at any time the height of the lower end of the rotor above the bottom of the feed bowl.

The bracket 85 is provided at places respectively located at opposite sides of the tubular portion 86 thereof with upwardly facing horizontal bearing surfaces 101 and 102, respectively, on which rest downwardly facing cooperative horizontal slide bearing surfaces 103 and 104, respectively, on the bottom of the horizontal rotor support 65. The rotor support 65 may be adjusted rectilinearly on these slide surfaces to center the rotor unit in relation to the feed bowl outlet. The adjusting means for this purpose comprises an adjusting screw 105, Fig. 5, operatively connected by a universal coupling arrangement 106 to the outer end of a bracket arm 107 on the outer end of the support 65. The adjusting screw 105 threadedly engages a socket member 108 which is attached by a transversely extending horizontal pivot element 109 to a bracket 110 on the adjacent face of the rectangular portion 89 of the column 84. By turning the adjusting screw 105 in a conventional manner about its axis in the socket member 108, the support 65 will be adjusted rectilinearly relative to the column 84 which is prevented from moving bodily in a horizontal direction by its thrust connection with the fixed stationary shaft 87.

The support 65 and its saddle bracket 85 may also be adjusted as a unit angularly about the vertical shaft 87 to a slight but adequate extent to center the rotor in relation to the feed bowl outlet. When so adjusted, the support 65 may be secured in place. The means for this purpose comprises a projecting end extension 111 of the support 65, Figs. 2 and 10, provided with a slot 112 therein, extending in a direction radial of the rotor holder. This slot 112 is undercut at 113 to accommodate a slide block 114 having therein a vertical threaded opening 115 engageable with the threaded shank 116 of a headed bolt 117. The headed bolt 117 is carried by a bracket 118 which is secured by a horizontal slot and bolt arrangement 119, Fig. 2, in laterally adjusted position along a horizontal guideway 120 in the vertical face of a stationary frame part 121. When angular adjustment of the rotor support about the shaft 87 is to be effected, the bracket 118 is loosened to permit lateral adjustment thereof and the bolt 117 is loosened sufficiently to permit the block 114 to slide in its slideway 113 on the angular or swinging adjustment of the support 65. After such adjustment, the bracket 120 is fastened securely in its position and the bolt 117 is tightened to hold the block 114 in place.

It previously has been pointed out that the rotor may be rotated by a chain 70 which encircles a driven sprocket 68 on the rotor chuck carrier. The chain 70, Fig. 2, extends around a drive sprocket 122 on the upper end of a vertical drive shaft 123 which extends through a vertical tubular member 124 carried by an outwardly extending end portion 125 of the support 65, Figs. 2 and 5, this shaft 123 being retained against accidental vertical displacement by thrust bearings 126 and 127, Fig. 2. The shaft 123 is connected by a universal joint 128 to a plural section telescopic shaft 129 which is connected by a universal joint 130 to a shaft 131 which projects upwardly through a bearing 132 on an arm 133 secured to the fixed bracket 95. The shaft 131 is connected through an overload clutch releasing mechanism 134 and a speed adjustment unit 135 with a motor 136. The motor 136 is mounted on an arm 137 projecting from the fixed bracket 95. This arrangement permits sufficient upward and lateral movement of the drive sprocket 122 relative to the motor 136 for the desired vertical and horizontal adjustments of the rotor main support 65. These may be effected without interruption of the driving of the rotor from the motor 136. The chain 70 is kept desirably taut by a chain tightening sprocket 138 mounted on a pivot arm 139 swingable about the axis of the shaft 123 and urged continuously by a spring 140 against the chain 70.

The fixed tubular shaft 87 provides a means for supplying cooling air to the rollers and other parts of the rotor supporting assembly and may receive cooling air from any suitable source through a connected supply pipe 141, Fig. 2. As shown in Fig. 5, the tubular member 87 may be provided with lateral ports 142 in the portion thereof extending through the part 89 and air may pass through these ports and through aligned lateral passages 143 and 144 in the part 89 and the adjacent walls of the support 65, respectively. From the passages 144 the cooling air passes into chambers 145 which are formed in the support 65 and from these chambers, air may pass through passages 146 into the chamber 65a within the support 65 housing the rotor chuck carrier and the rollers supporting such carrier. This arrangement provides adequate cooling of the metallic rotor mounting means.

*Supporting and adjusting means for the charge weight control tube*

The refractory tube 47 serves as a vertically adjustable gate valve for regulating flow of glass to the outlet passage or well 7. It also serves as a stationary inner circular wall against which the depending glass engaging prongs or legs 51 of the rotor unit impels and smears molten glass and it thereby cooperates with the rotor unit to disperse, attenuate and generally diffuse cords and contaminated streaks of glass in the glass stream passing spirally to the outflow gap between the lower end of the tube and the curb at the upper end of the outflow passage. The tube 47 further coacts or cooperates with the rotor to define an annular vent or stack for the upward flow of heated gases from the feed spout.

The mechanism for adjustably supporting the tube 47 in its operative position comprises a chuck consisting of an outer annular supporting member 147, Figs. 2 and 4, adapted to surround the upper end portion of the tube and having an inwardly extending narrow flange 148, Fig. 4, at its lower end on which an external flange 47a on the upper end of the refractory tube may rest. The tube chuck comprises also an inner annular clamping member 149 adapted to bear against the top of the flanged upper end of the tube 47 so as to hold the latter firmly in place in the lower portion of the outer chuck member 147 when an out turned flange 150 on the upper end of the inner chuck member 149 is fastened by eyebolts 151 to the underlying outwardly turned flange 152 on the upper end portion of the outer chuck member 147. The lower end of the inner chuck member 149 may be provided with spaced shallow cutouts 153 to allow circulation of air from the space 154 between the two chuck members 149 and 147, thus guarding against undue heating of the parts of the chuck.

The chuck may be applied to the tube 47 while the latter is cold and in a convenient location. The eyebolts supply convenient means for fastening a hoist to the assembled chuck and tube to handle them and move them as desired as a unit. In this manner, the tube may be preheated and then lowered to place so that the chuck will rest on the outwardly turned flange 152 of the outer chuck member in a seat 155 in the arcuate wall 156 of an end portion 157 of a horizontally disposed, adequately stiff and strong tube supporting arm 158, the seat 155 being defined in part by an inwardly extending flange 159 on which the flange 152 of the outer member of the tube chuck rests. The arcuate chuck receiving end portion 157 of the tube supporting arm is in the nature of a part of a bayonet joint in that it is open at one side through an angle of approximately 130°, Fig. 3, this permitting the chuck to be moved laterally through this opening after such chuck, and the tube supported thereby, have been lifted vertically high enough to cause the flanged upper end portion of the outer chuck member to clear the wall of the chuck accommodating arcuate seat in the outer end portion of the arm 158. Of course, the chuck and tube must be lifted as a unit high enough for the tube to clear the rotor mechanism. When the chuck is in its seated position in the outer end portion of its supporting arm, it may be clamped securely in place by clamping lugs 160 fastened by cap screws 161 to the outer end portion 157 of the arm 158 in positions to bear at their inner ends on embossed portions 162, Fig. 3, on the flange 150 at the top of the clamping member 149 of the chuck and bearing at their outer end on bosses 163 on the supporting arm.

The supporting arm 158 is supported at its end remote from the tube 47 on an eccentric collar 164 on the upper end of a vertical tubular shaft 165, being provided with a split collar controlled by tightening bolts 166 so as to be clamped rigidly to the eccentric collar 164 or loosened sufficiently to permit turning of the latter about the axis of the vertical shaft 165 when it is desired to adjust the arm 158 longitudinally in either of opposite directions to align the supported refractory tube 47 with the feed bowl outlet. The eccentric bushing 164 may be provided with a transverse opening 167, Fig. 3, in its projecting upper end portion to accommodate a tool, shown as a rod 168, which may be grasped and manipulated to effect such adjustment.

A lateral adjustment of the tube supporting end of the arm 158 and of the tube supported thereby in either of opposite directions generally transverse to that which may be effected by adjustment of the eccentric sleeve 164 also is provided to aid in centering the tube in relation to the feed bowl outlet. As shown in Fig. 3, the outer end portion of the arm 158 carries a fixed bracket 169 projecting laterally beyond the underlying rotor sprocket 68 and there provided with a small upturned, generally rectangular frame 170. This frame has a pair of parallel horizontally spaced side walls 170a between which an upstanding vertical crank pin 171 in the frame 170 may slide along the frame. The vertical crank pin 171 is carried by a crank hub 172, Fig. 4, on a vertical journal pin 173 which is adapted to be dropped into a closely fitting vertical hole 174 in the rotor main support 65. This journal pin 173 is dropped through the eye 175 of an eye rod 176 which extends through a fixed lug 177 on a portion of the rotor main support 65 near the outer end of the latter. A nut 178 on the threaded protruding end of the eye rod beyond the lug 177 may be tightened against the lug to apply sufficient tension on the journal pin 173 to cause the latter to be retained in its angularly adjusted position in the hole 174 by reason of its frictional contact with the wall of such hole. When the nut 178 has been loosened slightly, the upwardly projecting crank pin 171 may be manipulated to swing around the axis of the journal pin 173 against one or the other side walls 170a of the frame 170 to swing the outer end of the bracket 158 laterally in one direction or the other as may be required for alignment of the tube 47 with the feed bowl outlet. The upper end portion of the crank pin 171 may be provided with a transverse opening 179 for the reception of a suitable pin for use in manipulating it.

The tubular shaft 165 on which the arm 158 is mounted is shown in Fig. 4 as passing through a bearing structure which is diagrammatically indicated in part at 180. The actual structure for guiding and supporting the shaft 165 so that it may be adjusted vertically to effect vertical adjustment of the refractory tube 47 in relation to the curb at the top of the feeder outlet is not shown in detail since it is not, per se, part of the present invention. It may be substantially as disclosed in detail in U. S. Patent No. 1,760,254 of May 27, 1930, although I prefer to use the improved tubular shaft supporting and vertical adjustment mechanism of the co-pending application of Michael A. Koleda, Serial No. 656,063, filed March 21, 1946, now U. S. Patent No. 2,479,121, issued August 16, 1949, with which the present invention is of common ownership.

*Supporting and operating means for the charge shape control plunger*

The refractory plunger 48 is suspended from a chuck which preferably is as disclosed and claimed in my co-pending divisional application, Serial No. 282,887, filed April 17, 1952, and includes elements partially shown in Fig. 2 of the drawings of the instant application and indicated therein at 181 and 185, respectively. The chuck however may be of any suitable known type or construction.

The supporting and operating means for the plunger, considered as a whole, preferably is as disclosed and claimed in my co-pending divisional application, Serial No. 263,075, filed December 24, 1951, but may be of any suitable known construction and mode of operation.

*The feeder shear mechanism*

Any suitable known shear mechanism, none shown, may be employed in a glass feeder having the glass homogenizing and feed controlling means of the present invention but I prefer a shear mechanism embodying novel combinations of structural and operating features such as those which are disclosed and claimed in my co-pending divisional applications, Serial Nos. 263,076; 263,077; and 263,078; respectively, all filed December 24, 1951.

Figure 8:
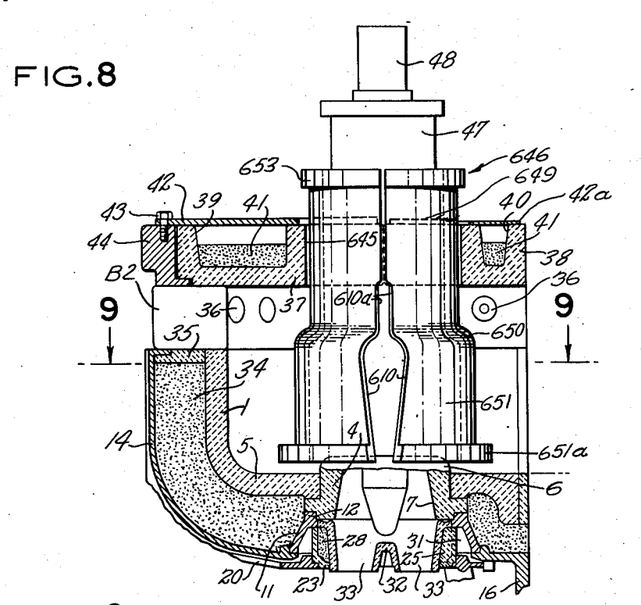
Fig. 8 is a longitudinal vertical section of the feeder bowl equipped with glass homogenizing and feed controlling means including a modified form of rotary member.

*Alternative form of glass mixing rotor, Figs. 8 and 9*

The form of rotor shown in Figs. 8 and 9 and generally designated 646 is like the rotor 46 shown in Fig. 1, for example, and hereinbefore particularly described in that it consists of a plurality of cooperative similar segmental sections—three in the example shown—the upper portion of which is slightly less, as 1–4″, than 120° in angular extent. Each of these segmental sections comprises a longitudinally straight arcuate upper portion 649, an outwardly flaring intermediate portion 650 and a longitudinally straight arcuate lower portion 651 which is the part that depends into the glass in the feed bowl 1 when the sections are assembled and the rotor thus provided is supported operatively in the bowl as shown in Fig. 8, the supporting and operating means therefor being the same as for the rotor 46. Each section has an outwardly projecting flange 653 adapted to fit into a seat in a chuck segment 55, Fig. 2. Each section also has an outwardly extending flange 651a at the lower end of the lower portion 651 to provide added stirring action on the glass at the bottom of the bowl around the curb 6.

The upper portion 649 of the rotor 646 is relatively longer than the corresponding portion of the rotor 46 and extends downwardly from a higher level completely through a vertical opening 645 in the bowl cover 37—38 to a level such that the flaring intermediate portion 650 of the rotor section is positioned just above the glass level. The opening 645 thus may have a straight vertical wall which has a diameter only slightly greater than that of the upper portion of the rotor and less than that of the lower portion of the rotor. The segmental sections may be individually raised for removal and thereafter replaced in the same manner as previously described herein to effect removal and replacement of the individual segmental sections of the rotor 46.

The rotor is provided with cutouts 610 extending in its wall from its bottom to a level above the glass in the bowl so as to allow glass and direct heat to reach the tube 47. Each such cutout may be provided between adjacent lateral edges of the rotor segmental sections by partially cutting away or appropriately forming such edges similarly so that the cutout has the desired configuration, area and vertical extent. In the example shown, each cutout increases slightly in width from the bottom of the rotor to about the glass level and then decreases abruptly to a relatively small width which is continued for the remaining upper portion 610a of the cutout. This narrower upper portion of the cutout is completely above the glass and is for the ingress of hot gases to the venting space between the upper portion of the rotor and the tube 47. The wider, lower portion of the cutout permits adequate inward passage of glass to the tube 47 and the side edges of this portion of the cutout give it a good glass mixing and blending action.

The rotor 646 having the arcuate glass mixing and blending lower portions as described is advantageously usable in feeding charges having a weight of 6 ounces or less although it also may be used for heavier charges as in the case of the leg or prong type stirrer 46. Either type will plow clinging glass from the bowl bottom around the curb and mix and blend such glass with hotter, less viscous higher level glass. The arcuate glass engaging portions 651 of the rotor 646 above the bottom flange 651a may be as thick as the remaining higher portions of the rotor sections and nearly as extensive angularly while the glass engaging portions 51 of the rotor 46 are relatively thicker and of much less angular extent so that relatively wider area spaces are provided between adjacent lower portions of the rotor 46 for ingress of glass and direct heat to the tube 47. Each type rotor is effective in conjunction with the tube 47 and feed bowl wall effectively to mix and blend the glass in the bowl so as to equalize its temperature just before it flows to the glass discharge outlet and also to have a good cord dispersing action.

I claim:

1. A glass blending and circulating implement adapted to project through an opening in the cover of a glass feeding chamber or channel so that its lower end depends into the glass in the chamber or channel and its upper end extends above the cover, said implement comprising a plurality of cooperative similar sections having segmental upper arcuate portions which form a cylinder adapted to extend through said opening with but slight clearance between itself and the wall of the opening and having lower portions offset radially outward in relation to their upper portions so as to lie in a circle of greater diameter than the opening in the cover, said outwardly offset lower portions being of less arcuate extent than the upper portions so that gaps are provided between adjacent such lower portions to permit the flow of glass and heat radiation between them and being formed with out-turned flanges at their lower extremities, said lower portions being partially cut away at their side edges from their lower ends upward to a height above the level of the glass in the chamber or channel so that the gaps between adjacent side edges of the lower portions of the sections are of predetermined contour.

2. In glass feeding apparatus, a glass container having a discharge outlet passage in its bottom adapted to be submerged by glass in the container, a cover for the container comprising a plurality of separable blocks cooperatively formed to provide a vertical opening between them and in line with said outlet when the blocks are in their operative cover-forming positions, a vertically adjustable tubular discharge regulating implement depending through said opening in spaced relation to the wall thereof so that the lower end of the implement is disposed in glass flow regulating relation to an annular portion of the container bottom surrounding the upper end of the outlet passage and located directly beneath and in line with the implement, the lower end of said implement having a diameter greater than that of the upper end of the outlet passage, a rotary glass stirring implement comprising a plurality of vertically disposed segmental sections arranged in a circle around and in spaced relation to said discharge regulating implement with their upper portions extending through said opening in the cover close to the wall thereof and to one another so as to restrict to a slight amount loss of heat from the container by reason of escape of hot gases through the opening in the cover at the outer side of said sections, said sections having lower portions offset radially outward from their upper portions so as to dip into the glass in the container in a circle having a diameter substantially greater than that of the opening in the cover, an annular rotary carrier for the stirring implement sections located above and in line with said opening in the cover, said carrier having an annular seat, and supporting elements rigid with the upper ends of said segmental sections and extending outwardly therefrom so as to bear at their outer portions on said annular seat of said carrier and thus support the sections operatively from the carrier when the sections are assembled and at the same time permit independent raising and removal of the individual sections while the carrier remains in place.

3. In glass feeding apparatus, a glass container having a discharge outlet passage in its bottom adapted to be submerged by glass in the container, a cover for the container having an opening in line with said outlet, a vertically adjustable tubular discharge regulating implement depending through said opening in spaced relation to the wall thereof so that the lower end of the implement is disposed in glass flow regulating relation to an annular portion of the container bottom surrounding the upper end of the outlet passage, and located directly beneath and in line with the implement, the lower end of said implement having a diameter greater than that of the upper end of the outlet passage, and a rotary glass stirring implement comprising a plurality of vertically disposed segmental sections arranged in a circle around and in spaced relation to said discharge regulating implement with their upper portions extending through said opening in the cover close to the wall thereof and to one another so as to restrict to a slight amount loss of heat from the container by reason of escape of hot gases through the opening in the cover at the outer side of said sections, said sections having lower portions offset radially outward from their upper portions so as to dip into the glass in the container in a circle having a diameter substantially greater than that of at least a portion of the opening in the cover, the opening in the container cover and the portions of the sections of the stirring implement extending therethrough being formed to have substantially vertical cylindrical walls and the outwardly offset lower glass engaging portions of said sections being arcuate in cross section and partially cut away at their side edges from their lower ends upward to a level above that of the glass in the container so that openings of predetermined contour extending above the glass are provided between adjacent side edges of adjacent sections.

4. In glass feeding apparatus, the combination defined by claim 3 wherein the lower glass engaging portions of the stirring implement have out-turned flanges at their lower extremities.

5. In glass feeding apparatus, a glass container having a discharge outlet passage in its bottom adapted to be submerged by glass in the container, a cover for the container having an opening in line with said outlet, a discharge regulating implement depending through said opening in spaced relation to the wall thereof so that the lower end of the implement is disposed in glass flow regulating relation to the upper end of the outlet passage, a rotary glass stirring implement comprising a plurality of vertically disposed segmental sections arranged in a circle around and in spaced relation to said discharge regulating implement with their upper portions extending through said opening in the cover close to the wall thereof and to one another so as to restrict to a slight amount loss of heat from the container by reason of escape of hot gases through the opening in the cover at the outer side of said sections, said sections having lower portions offset radially outward from their upper portions so as to dip into the glass in the container in a circle having a diameter substantially greater than that of at least a portion of the opening in the cover, a chuck for said stirring implement, said chuck comprising segmental sections corresponding in number with the stirring implement sections, releasable means securing the chuck sections to the upper end portions of the stirring implement sections, an annular carrier supporting in assembled relation said chuck sections and the stirring implement sections secured thereto, means to rotate said annular carrier and the sections supported thereby about the axis of said carrier, and vertically and horizontally adjustable means supporting said carrier in a horizontal position with its axis vertically aligned with the outlet passage in the bottom of the glass container.

6. The combination in glass feeding apparatus of a glass container having an outlet passage in its bottom and a cover having an opening above and in line with said outlet passage, a rotary glass stirring implement comprising a plurality of vertically disposed segmental sections having upper end portions extending through the opening in the cover and projecting above the latter and lower portions depending in the container and offset in relation to the upper end portions, and supporting means for said stirring implement sections supporting them by their upper ends in a circular series so that their offset lower portions are turned radially outward in respect to the axis of said circular series, their lower ends are close to the bottom of the container and are spaced angularly around the upper end of the outlet passage in the bottom of the container and the circular series of stirring implement sections is rotatable as a unit about its said axis, said supporting means comprising a stationary upright supporting shaft located at one side of said glass container, a horizontal supporting arm mounted on said shaft so that a portion of the arm overhangs the container cover and is formed to provide a generally cylindrical holder overlying and approximately in line with the opening in the container cover, angularly spaced, horizontally disposed rollers mounted in the wall of said holder to project into its interior, an annular chuck carrier having an externally flanged upper end portion bearing upon said rollers, angularly spaced, vertically disposed rollers on said holder in positions to bear against the periphery of the flanged upper end portion of the carrier to center the latter in said holder, said carrier having an internally flanged lower end portion, and a chuck comprising individual segmental sections for the segmental sections of the stirring implement, said chuck sections being attachable to the upper end portions of the stirring implement sections and being supported in a circular series on the internally flanged lower end portion of said carrier to suspend said stirring implement sections from the carrier.

7. The combination defined by claim 6 wherein said upright supporting shaft and said overhanging arm are formed internally to conduct cooling air to the interior of the holder and the parts therein.

8. The combination defined by claim 6 and, in addition, an annular sprocket fitting on said carrier and secured thereto, a drive sprocket rotatably supported on said arm, a chain trained about said sprockets, and means to rotate said drive sprocket.

9. The combination in glass feeding apparatus of a glass container having an outlet passage in its bottom and a cover having an opening above and in line with said outlet passage, a rotary glass stirring implement comprising a plurality of vertically disposed segmental sections having upper end portions extending through the opening in the cover and projecting above the latter and lower portions depending in the container and offset in relation to the upper end portions, and supporting means for said stirring implement sections supporting them by their upper ends in a circular series so that their offset lower portions are turned radially outward in respect to the axis of said circular series, their lower ends are close to the bottom of the container and are spaced angularly around the upper end of the outlet passage in the bottom of the container and the circular series of stirring implement sections is rotatable as a unit about its said axis relative to said container, said supporting means comprising an upright supporting shaft at one side of said glass container, a horizontal saddle bracket having an integral vertical tubular column projecting both upwardly and downwardly from the middle portion thereof, said tubular column fitting on the upright shaft for vertical sliding and angular turning movements relative thereto, adjustable means interconnecting the tubular column and the stationary shaft vertically to adjust the position of said bracket on said shaft and to maintain any such adjustment, a horizontal arm resting slidably on said saddle bracket so that an end portion of the arm extends over the opening in the container cover, said arm having a vertical aperture therein through which a portion of said tubular column extends, the walls of said opening in the arm and of the portion of the column therein being cooperatively formed to permit horizontal movement of the arm on said bracket only in the direction of length thereof and so that said arm and bracket will turn as a unit about the axis of the supporting shaft when either is turned, means carried by said end portion of said arm rotatably to support the stirring implement sections by their upper ends as aforesaid, means to adjust said arm longitudinally on said bracket and to maintain any such adjustment, and releasable means to maintain any angularly adjusted position of the arm about the axis of said supporting shaft.

10. The combination defined by claim 9 and, in addition, means to rotate said circular series of stirring implement sections about its vertical axis, said last-named means comprising a driver occupying a relatively fixed position adjacent to said supporting shaft and motion transmitting connections between said driver and the means carried by said arm to rotatably support said stirring implement sections, said motion transmitting connections being constructed and arranged to be operative during any of said adjustments of said arm relative to said supporting shaft.

11. In glass feeding apparatus, a glass container having a discharge outlet passage in its bottom adapted to be submerged by glass in the container, a cover for the container having an opening in line with said outlet, a vertically adjustable tubular discharge regulating implement depending through said opening in spaced relation to the wall thereof so that the lower end of the implement is disposed in glass flow regulating relation to an annular portion of the container bottom surrounding the upper end of the outlet passage and located directly beneath and in line with the implement, a rotary glass stirring implement comprising a plurality of vertically disposed segmental sections arranged in a circle around and in spaced relation to said discharge regulating implement with their upper portions extending through said opening in the cover close to the wall thereof, to the discharge regulating implement and to one another so as to restrict to a slight amount loss of heat from the container by reason of radiation and escape of hot gases through the opening in the cover at the outer side of said sections and through the space between the discharge regulating implement and the inner side of said sections, said sections having lower portions offset radially outward from their upper portions so as to dip into the glass in the container in a circle having a diameter substantially greater than that of the opening in the cover, and an annular rotatable carrier for the segmental stirrer sections holding them in operating position and having an opening through which the segmental sections may be raised for removal and replacement.

12. In glass feeding apparatus, the combination as defined by claim 11 wherein the lower glass engaging portions of said sections of the stirring implement are formed as substantially straight vertical legs or prongs having their lateral surfaces at both the inner and outer sides thereof convexly curved in horizontal configuration.

13. In glass feeding apparatus, a glass container having a discharge outlet passage in its bottom adapted to be submerged by glass in the container, a cover for the container having an opening in line with said outlet, a reciprocable charge shape controlling plunger depending through said opening and projecting into the glass above the outlet, a charge weight controlling sleeve surrounding the plunger and depending through said opening in spaced relation to the bottom of the container so that the lower end of the sleeve is disposed in glass flow regulating relation to an annular portion of the container bottom surrounding the upper end of the outlet passage and located directly beneath and in line with the sleeve, a rotary glass stirring implement comprising a plurality of vertically disposed segmental sections arranged in a circle around and in spaced relation to said flow regulating sleeve with their upper portions extending through said opening in the cover close to the wall thereof, to the flow regulating sleeve and to one another so as to restrict to a slight amount loss of heat from the container by reason of radiation and of escape of hot gases through the opening in the cover at the outer side of said sections and between the sleeve and inner side of the sections, said sections having lower portions offset radially outward from their upper portions so as to dip into the glass in the container in a circle having a diameter substantially greater than that of the opening in the cover, a vertically reciprocable carrier for the plunger, a stationary but vertically adjustable carrier for the sleeve located beneath the plunger carrier, and an annular rotatable carrier for the segmental stirrer sections located beneath the sleeve carrier and holding the stirrer sections in operating position, said annular carrier for the segmental sections having an opening through which said sections may be raised for removal and replacement.

14. In glass feeding apparatus, the combination defined by claim 13 wherein said sleeve carrier is shaped and positioned to provide clearance for upward movement of a segmental stirrer section as the latter is raised through the opening of the annular carrier of said stirrer sections.

15. A glass blending and circulating implement shaped to resist the stresses caused by its action on viscous glass, and adapted to extend downwardly through a cylindrical opening in the cover of a glass feeding chamber or channel so that its lower end depends into the glass in the chamber or channel and its upper end is positioned above the cover, said implement comprising a plurality of cooperative similar sections having segmental upper cylindrical portions which form a cylinder adapted to extend through said opening with but slight clearance between itself and the wall of the opening when the sections are cooperatively associated with one another, each section having an arcuate radially outward flaring portion directly below its upper portion, an arcuate intermediate portion extending below said flaring portion and tapering downwardly to become narrower along its arc and becoming thicker radially and a rodlike lower portion off-set radially outward in relation to the upper cylindrical portion and into which said arcuate intermediate portion is merged, said lower portion being of less arcuate extent than the upper portion so that gaps are provided between adjacent such lower portions of the associated sections to permit the flow of glass and heat radiation between them, said lower portions lying in a circle of greater diameter than that of the opening in the cover.

KARL E. PEILER.

References Cited in the file of this patent

UNITED STATES PATENTS

| Number | Name | Date |
|---|---|---|
| 329,969 | Sweet | Nov. 10, 1885 |
| 992,230 | Miller | May 16, 1911 |
| 1,216,775 | Conradson | Feb. 20, 1917 |
| 1,262,594 | Akimoff | Apr. 9, 1918 |

(Other references on following page)

UNITED STATES PATENTS

| Number | Name | Date |
|---|---|---|
| 1,328,799 | Peiler | Jan. 20, 1920 |
| 1,519,885 | Tucker et al. | Dec. 16, 1924 |
| 1,603,862 | Peiler | Oct. 19, 1926 |
| 1,612,658 | Soubier | Dec. 28, 1926 |
| 1,626,705 | Soubier | May 3, 1927 |
| 1,792,932 | Rule | Feb. 17, 1931 |
| 1,810,736 | Soubier | June 16, 1931 |
| 1,835,553 | Barker | Dec. 8, 1931 |
| 1,869,921 | Soubier | Aug. 2, 1932 |
| 1,870,210 | Soubier | Aug. 2, 1932 |
| 1,884,427 | Wardley | Oct. 25, 1932 |
| 1,909,152 | Peiler | May 16, 1933 |
| 1,950,339 | Barker | Mar. 6, 1934 |
| 2,020,143 | Haub | Nov. 5, 1935 |
| 2,040,789 | Honiss | May 12, 1936 |
| 2,077,147 | Honiss | Apr. 13, 1937 |
| 2,217,182 | Peiler | Oct. 8, 1940 |
| 2,246,461 | Cannon | June 17, 1941 |
| 2,370,618 | Danner | Mar. 6, 1945 |
| 2,401,994 | Weber | June 11, 1946 |
| 2,470,558 | Honiss | May 17, 1949 |
| 2,479,121 | Koleda | Aug. 16, 1949 |
| 2,515,481 | Wiley et al. | July 18, 1950 |